US012443822B2

(12) United States Patent
Scanlon et al.

(10) Patent No.: US 12,443,822 B2
(45) Date of Patent: Oct. 14, 2025

(54) CONTEXT-BASED SOCIAL AGENT INTERACTION

(71) Applicant: Disney Enterprises, Inc., Burbank, CA (US)

(72) Inventors: Raymond J. Scanlon, Burbank, CA (US); Dawson Dill, Burbank, CA (US); Ashley N. Girdich, Glendale, CA (US); Robert P. Michel, Toluca Lake, CA (US); Komath Naveen Kumar, Los Angeles, CA (US); John J. Wiseman, Los Angeles, CA (US); James R. Kennedy, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1039 days.

(21) Appl. No.: 17/344,737

(22) Filed: Jun. 10, 2021

(65) Prior Publication Data
US 2022/0398427 A1    Dec. 15, 2022
US 2025/0156675 A2    May 15, 2025

(51) Int. Cl.
G06N 3/006    (2023.01)
G06T 13/40    (2011.01)
G06T 19/00    (2011.01)
G06T 19/20    (2011.01)

(52) U.S. Cl.
CPC ............ *G06N 3/006* (2013.01); *G06T 13/40* (2013.01); *G06T 19/006* (2013.01); *G06T 19/20* (2013.01)

(58) Field of Classification Search
CPC ....... G06N 3/006; G06T 13/40; G06T 19/006; G06T 19/20; G06F 40/35
See application file for complete search history.

(56) References Cited

U.S. PATENT DOCUMENTS

2020/0143265 A1*   5/2020   Jonnalagadda ........ G06N 3/045
2021/0142794 A1*   5/2021   Mathias .................. G10L 15/22
2022/0310078 A1*   9/2022   Schuetz .............. G10L 15/1815

OTHER PUBLICATIONS

Williams et al. "Partially observable Markov decision processes for spoken dialog systems" 2006 (Year: 2006).*

(Continued)

*Primary Examiner* — Rehana Perveen
*Assistant Examiner* — Troy A Maust
(74) *Attorney, Agent, or Firm* — Farjami & Farjami LLP (57) ABSTRACT

A system for performing context-based management of social agent interactions includes processing hardware and a memory storing a software code. The processing hardware executes the software code to detect the presence of an interaction partner, identify a present state of an interaction with the interaction partner, and to determine, based on the present state, a first score for each of multiple interactive expressions for use in initiating or continuing the interaction. The processing hardware further executes the software code to predict a state change of the interaction based on each of the interactive expressions to provide multiple predicted state changes corresponding respectively to the multiple interactive expressions, to determine, using the predicted state changes, a second score for each of the interactive expressions, and to select, using the first scores and the second scores, at least one of the interactive expressions to initiate or continue the interaction.

20 Claims, 7 Drawing Sheets

(56) References Cited

OTHER PUBLICATIONS

"IEEE Standard Ontologies for Robotics and Automation" retrieved from https://ieeexplore.ieee.org/stamp/stamp.jsp?tp=&arnumber=7084073 on Sep. 28, 2024 (Year: 2015).*

Jason D. Williams, Steve Young, Partially observable Markov decision processes for spoken dialog systems. AT&T Labs—Research, 180 Park Avenue, Florham Park, NJ 07932, USA Cambridge University, Engineering Department, UK Received Jan. 3, 2006; received in revised form May 3, 2006; accepted Jun. 30, 2006 Available online Aug. 11, 2006. pp. 393-422.

Esther Levin, Roberto Pieraccini, Wieland Eckert. Using Markov Decision Process for Learning Dialogue Strategies. Conference Paper in Acoustics, Speech, and Signal Processing, 1988. ICASSP-88., 1988 International Conference on • Jun. 1998. pp. 1-5.

Extended European Search Report dated Oct. 25, 2022 for EP Application 22172879.3.

Daniel Jurafsky and James H. Martin "Speech and Language Processing: An Introduction to Natural Language Processing, Computational Linguistics, and Speech Recognition" Third Edition draft Oct. 16, 2019 pp. 487-517.

* cited by examiner

CONTEXT-BASED SOCIAL AGENT INTERACTION

BACKGROUND

Advances in artificial intelligence have led to the development of a variety of devices providing dialogue-based interfaces that simulate social agents. However, conventional dialogue interfaces typically project a single synthesized persona that tends to lack character and naturalness. In addition, the dialog interfaces provided by the conventional art are typically transactional, and indicate to a user that they are listening for a communication from the user by responding to an affirmative request by the user.

In contrast to conventional transactional social agent interactions, natural communications between human beings are more nuanced, varied, and dynamic. That is to say, typical shortcomings of conventional social agents include their inability to engage in natural, fluid interactions, their inability to process more than one statement or question concurrently, and their inability to repair a flaw in an interaction, such as a miscommunication or other conversation breakdown. Moreover, although existing social agents offer some degree of user personalization, for example tailoring responses to an individual user's characteristics or preferences, that personalization remains limited by their fundamentally transactional design, which makes it unnecessary for conventional social agents to remember more than a limited set of predefined keywords, such as user names and basic user preferences.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing context-based social agent interaction that address and overcome the deficiencies in the conventional art. It is noted that, as defined in the present application, the term "interactive expression" may refer to language based communications in the form of speech or text, for example, and in some implementations may include non-verbal expressions. Moreover, the term "non-verbal expression" may refer to vocalizations that are not language based, i.e., non-verbal vocalizations, as well as to physical gestures and postures. Examples of non-verbal vocalizations may include a sigh, a murmur of agreement or disagreement, or a giggle, to name a few.

It is further noted that the expression "context-based interaction" refers to an interaction by a social agent with an interaction partner, such as a human being for example, that may take into account the goal of the interaction, as well as past, present, and predicted future states of the interaction. Thus, an interactive expression for use by a social agent to initiate or continue a context-based interaction may be determined based on past interactive expressions by the social agent and interaction partner, the present state of the interaction, a predicted response by the interaction partner to a next interactive expression by the social agent, and, in some implementations, the effect of that predicted response on progress toward the interaction goal. Furthermore, in some implementations, the present context-based social agent interaction solution advantageously enables the automated determination of naturalistic expressions for use by a social agent in responding to an interaction partner.

It is also noted that, as used in the present application, the terms "automation," "automated," and "automating" refer to systems and processes that do not require the participation of a human administrator. Although in some implementations the interactive expressions selected by the systems and methods disclosed herein may be reviewed or even modified by a human editor or system administrator, that human involvement is optional. Thus, the methods described in the present application may be performed under the control of hardware processing components of the disclosed systems.

Furthermore, as used in the present application, the term "social agent" refers to a non-human communicative entity rendered in hardware and software that is designed for expressive interaction with one or more interaction partners, which may be human beings, other interactive machines instantiating non-human social agents, or a group including one or more human beings and one or more other interactive machines. In some use cases, a social agent may be instantiated as a virtual character rendered on a display and appearing to watch and listen to an interaction partner in order to have a conversation with the interaction partner. In other use cases, a social agent may take the form of a machine, such as a robot for example, appearing to watch and listen to an interaction partner in order to converse with the interaction partner. Alternatively, a social agent may be implemented as a mobile device software application providing an automated voice response (AVR) system, or an interactive voice response (IVR) system, for example.

Figure 1:
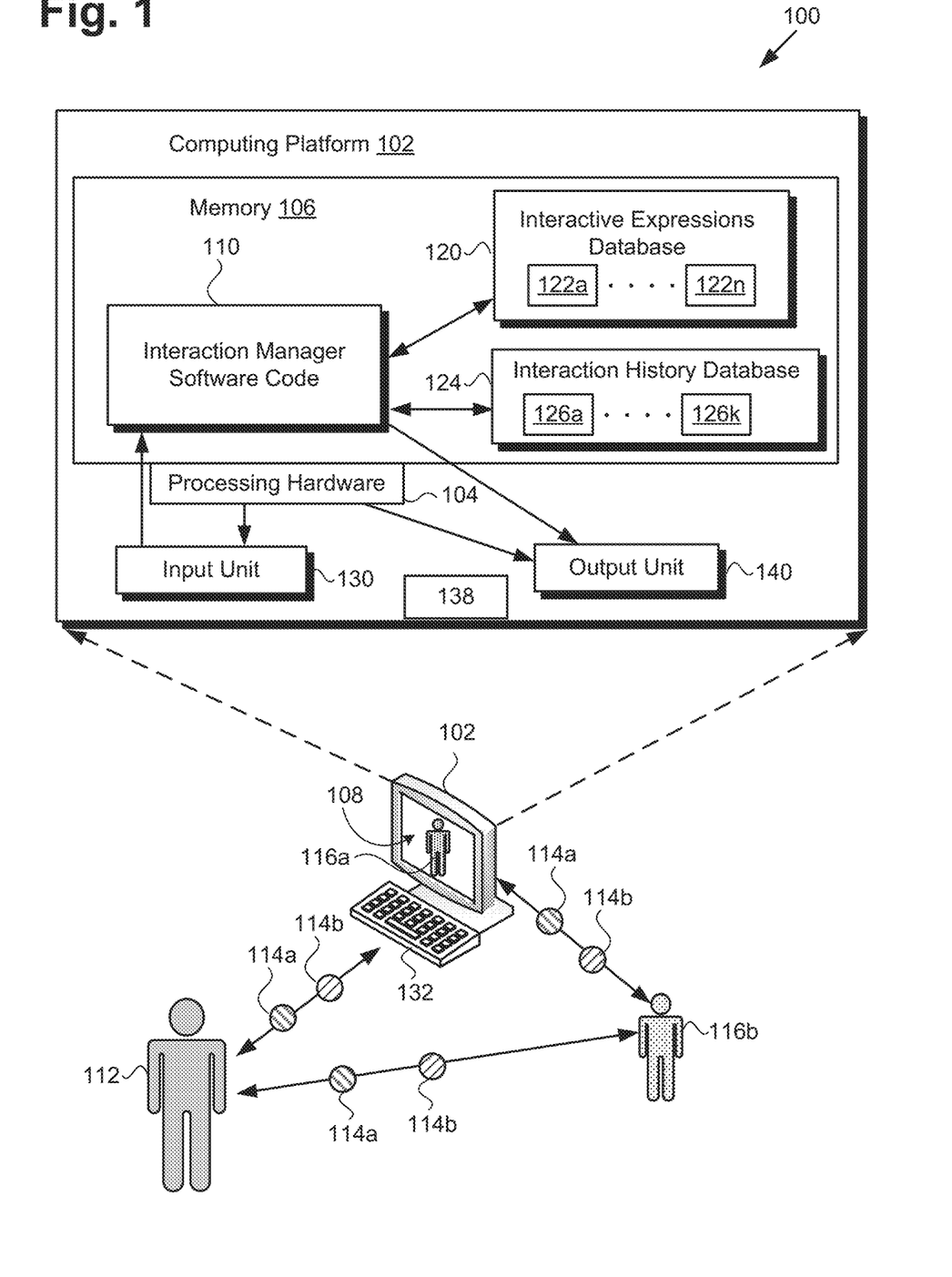
FIG. 1 shows an exemplary system for providing context-based social agent interaction, according to one implementation.

FIG. 1 shows a diagram of system 100 providing context-based social agent interaction, according to one exemplary implementation. As shown in FIG. 1, system 100 includes processing hardware 104, input unit 130 including input device 132, output unit 140 including display 108, transceiver 138, and memory 106 implemented as a non-transitory storage medium. According to the present exemplary implementation, memory 106 stores interaction manager software code 110, interactive expressions database 120 including interactive expressions 122a, . . . , 122n (hereinafter "interactive expressions 122a-122n"), and interaction history database 124 including interaction histories 126a, . . . , 126k (hereinafter "interaction histories 126a-126k"). In addition, FIG. 1 shows social agents 116a and 116b for which interactive expressions for initiating or continuing an interaction may be selected by interaction manager software code 110, when executed by processing hardware 104. Also shown in FIG. 1 are system user 112 of system 100 acting as an interaction partner of one or both of social agents 116a and 116b, as well as one or more interactive expressions 114a and 114b selected for one of social agents 116a or 116b by interaction manager software code 110, to initiate or continue the interaction with one another, or with system user 112 (one or more interactive expressions 114a and 114b hereinafter referred to as "selected interactive expression(s) 114a and 114b").

It is noted that system 100 may be implemented as any machine configured to instantiate a social agent, such as social agent 116a or 116b. It is further noted that although FIG. 1 depicts social agent 116a as being instantiated as a virtual character rendered on display 108, and depicts social agent 116b as a robot, those representations are provided merely by way of example. In other implementations, one or both of social agents 116a and 116b may be instantiated by tabletop machines, such as speakers, displays, or figurines, or by wall mounted speakers or displays, to name a few examples. It is noted that social agent 116b corresponds in general to social agent 116a and may include any of the features attributed to social agent 116a. Thus, although not shown in FIG. 1, like social agent 116a, social agent 116b may include processing hardware 104, input unit 130, output unit 140, transceiver 138, and memory 106 storing software code 110, interactive expressions database 120 including interactive expressions 122a-122n, and interaction history database 124 including interaction histories 126a-126k.

It is further noted that although FIG. 1 depicts one system user 112 and two social agents 116a and 116b, that representation is merely exemplary. In other implementations, one social agent, two social agents, or more than two social agents may engage in an interaction with one another, with one or more human beings corresponding to system user 112, or with one or more human beings as well as with one or more other social agents. That is to say, in various implementations interaction partners may include one or more interactive machines each configured to instantiate a social agent, one or more human beings, or an interactive machine or machines and one or more human beings.

It is also noted that each of interaction histories 126a-126k may be an interaction history dedicated to interactions of social agent 116a with a particular interaction partner, such as one of system user 112 or the interactive machine instantiating social agent 116b, or to one or more distinct temporal sessions over which an interaction of social agent 116a with one or more of system user 112 and the interactive machine instantiating social agent 116b extends. That is to say, in some implementations, some or all of interaction histories 126a-126k may be personal to a respective human being or specific to another interactive machine, while in other implementations, some or all of interaction histories 126a-126k may be dedicated to a particular temporal interaction session or series of temporal interaction sessions including one or more human beings, one or more interactive machines, or one or more of both.

Moreover, while in some implementations interaction histories 126a-126k may be comprehensive with respect to a particular interaction partner or temporal interaction, in other implementations, interaction histories 126a-126k may retain only a predetermined number of the most recent interactions with an interaction partner, or a predetermined number of interactive exchanges or turns during an interaction. Thus, in some implementations, interaction history 126a may store only the most recent four, or any other predetermined number of interactive expressions between social agent 116a and system user 112 or social agent 116b, or the most recent four, or any other predetermined number of interactive expressions by any or all participants in a group interaction session.

It is emphasized that the data describing previous interactions and retained in interaction history database 124 is exclusive of personally identifiable information (PII) of system users with whom social agents 116a and 116b have interacted. Thus, although social agents 116a and 116b are typically able to distinguish an anonymous system user with whom a previous interaction has occurred from anonymous system users having no previous interaction experience with social agent 116a or social agent 116b, interaction history database 124 does not retain information describing the age, gender, race, ethnicity, or any other PII of any system user with whom social agent 116a or social agent 116b converses or otherwise interacts.

Although the present application refers to interaction manager software code 110, interactive expressions database 120, and interaction history database 124 as being stored in memory 106 for conceptual clarity, more generally, memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as interaction manager software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

Input device 132 of system 100 may include any hardware and software enabling system user 112 to enter data into system 100. Examples of input device 132 may include a keyboard, trackpad, joystick, touchscreen, or voice command receiver, to name a few. Transceiver 138 of system 100 may be implemented as any suitable wireless communication unit. For example, transceiver 138 may be implemented as a fourth generation (4G) wireless transceiver, or as a 5G wireless transceiver. In addition, or alternatively, transceiver 138 may be configured for communications using one or more of WiFi, Bluetooth, ZigBee, and 60 GHz wireless communications methods.

Figure 2A:
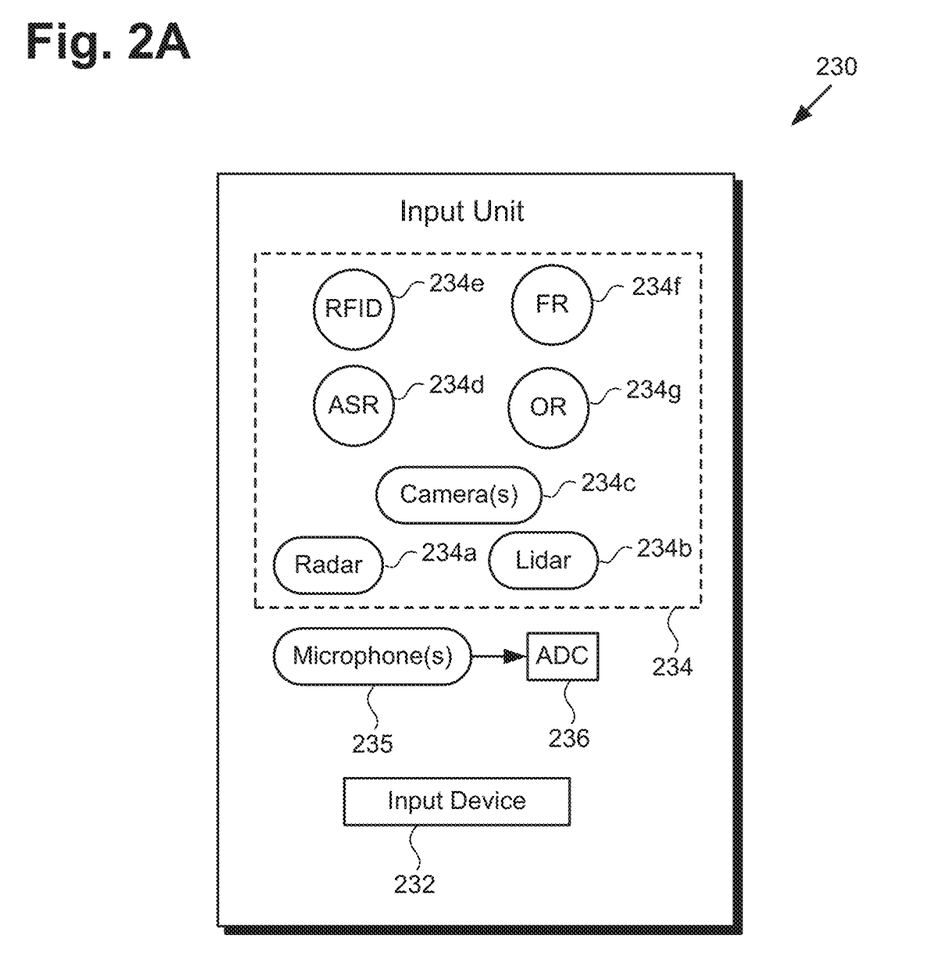
FIG. 2A shows a more detailed diagram of an input unit suitable for use as a component of the system shown in FIG. 1, according to one implementation.

FIG. 2A shows a more detailed diagram of input unit 230 suitable for use as a component of system 100, in FIG. 1, according to one implementation. As shown in FIG. 2A, input unit 230 may include input device 232, multiple sensors 234, one or more microphones 235 (hereinafter "microphone(s) 235"), and analog-to-digital converter (ADC) 236. As further shown in FIG. 2A, sensors 234 of input unit 230 may include one or more of radio detection and ranging (radar) detector 234a, laser imaging, detection, and ranging (lidar) detector 234b, one or more cameras 234c (hereinafter "camera(s) 234c"), automatic speech recognition (ASR) sensor 234d, radio-frequency identification (RFID) sensor 234e, facial recognition (FR) sensor 234f, and object recognition (OR) sensor 234g. Input unit 230 and input device 232 correspond respectively in general to input unit 130 and input device 132, in FIG. 1. Thus, input unit 130 and input device 132 may share any of the characteristics attributed to respective input unit 230 and input device 232 by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than radar detector 234a, lidar detector 234b, camera(s) 234c, ASR sensor 234d, RFID sensor 234e, FR sensor 234f, and OR sensor 234g. For example, in implementations in which the anonymity of system user 112 is a priority, input unit 130/230 may include microphone(s) 235 and radar detector 234a or lidar detector 234b, as well as in some instances RFID sensor 234e, but may omit camera(s) 234c, ASR sensor 234d, FR sensor 234f, and OR sensor 234g. In other implementation, input unit 130/230 may include microphone(s) 235, radar detector 234a, and camera(s) 234c but may omit lidar detector 234b, ASR sensor 234d, RFID sensor 234e, FR sensor 234f, and OR sensor 234g. Moreover, in some implementations, sensors 234 may include a sensor or sensors other than one or more of radar detector 234a, lidar detector 234b, camera(s) 234c, ASR sensor 234d, RFID sensor 234e, FR sensor 234f, and OR sensor 234g. It is further noted that, when included among sensors 234 of input unit 130/230, camera(s) 234c may include various types of cameras, such as red-green-blue (RGB) still image and video cameras, RGB-D cameras including a depth sensor, and infrared (IR) cameras, for example.

Figure 2B:
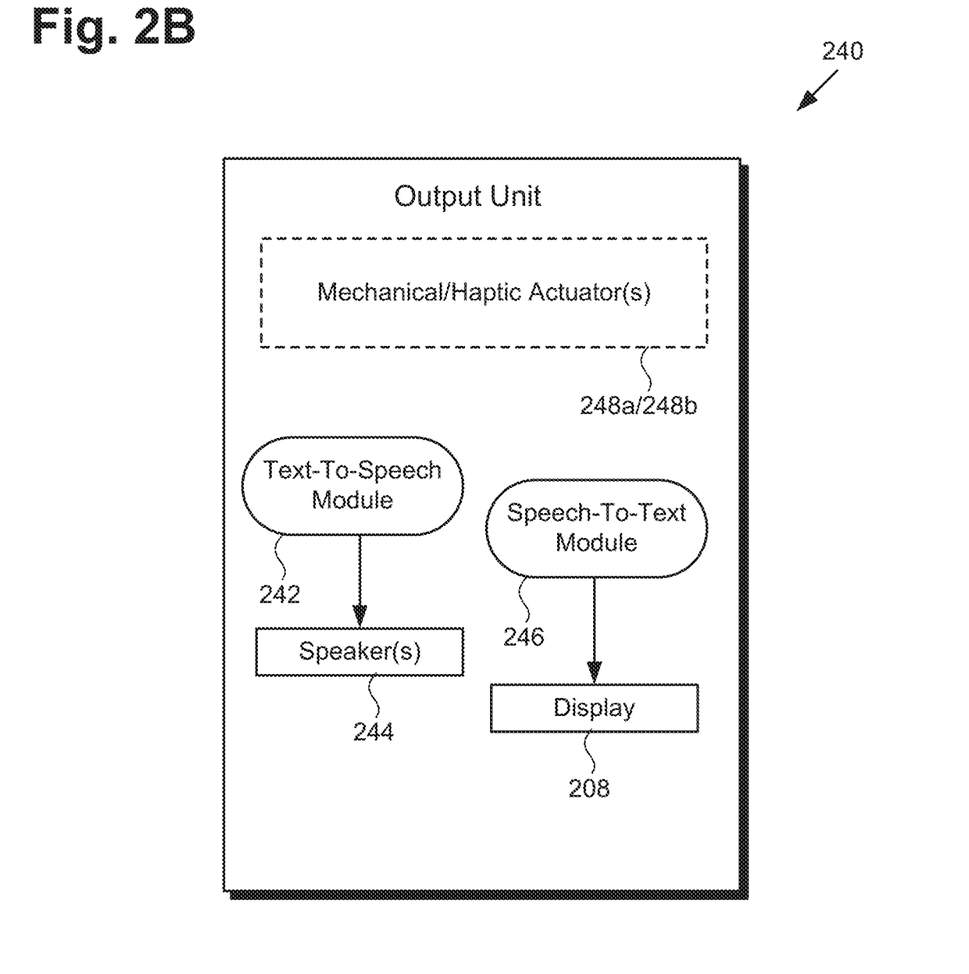
FIG. 2B shows a more detailed diagram of an output unit suitable for use as a component of the system shown in FIG. 1, according to one implementation.

FIG. 2B shows a more detailed diagram of output unit 240 suitable for use as a component of system 100, in FIG. 1, according to one implementation. As shown in FIG. 2B, output unit 240 may include one or more of Text-To-Speech (TTS) module 242 in combination with one or more audio speakers 244 (hereinafter "speaker(s) 244"), and Speech-To-Text (STT) module 246 in combination with display 208. As further shown in FIG. 2B, in some implementations, output unit 240 may include one or more mechanical actuators 248a (hereinafter "mechanical actuator(s) 248a"), one or more haptic actuators 248b (hereinafter "haptic actuator(s) 248b"), or a combination of mechanical actuator(s) 248a and haptic actuators(s) 248b. It is further noted that, when included as a component or components of output unit 240, mechanical actuator(s) 248a may be used to produce facial expressions by social agents 116a and 116b, and/or to articulate one or more limbs or joints of social agents 116a and 116b. Output unit 240 and display 208 correspond respectively in general to output unit 140 and display 108, in FIG. 1. Thus, output unit 140 and display 108 may share any of the characteristics attributed to output unit 240 and display 208 by the present disclosure, and vice versa.

It is noted that the specific features shown to be included in output unit 140/240 are merely exemplary, and in other implementations, output unit 140/240 may include more, or fewer, features than TTS module 242, speaker(s) 244, STT module 246, display 208, mechanical actuator(s) 248a, and haptic actuator(s) 248b. Moreover, in other implementations, output unit 140/240 may include a feature or features other than one or more of TTS module 242, speaker(s) 244, STT module 246, display 208, mechanical actuator(s) 248a, and haptic actuator(s) 248b. It is further noted that display 108/208 of output unit 140/240 may be implemented as a liquid crystal display (LCD), light-emitting diode (LED) display, organic light-emitting diode (OLED) display, quantum dot (QD) display, or any other suitable display screen that perform a physical transformation of signals to light.

Figure 3:
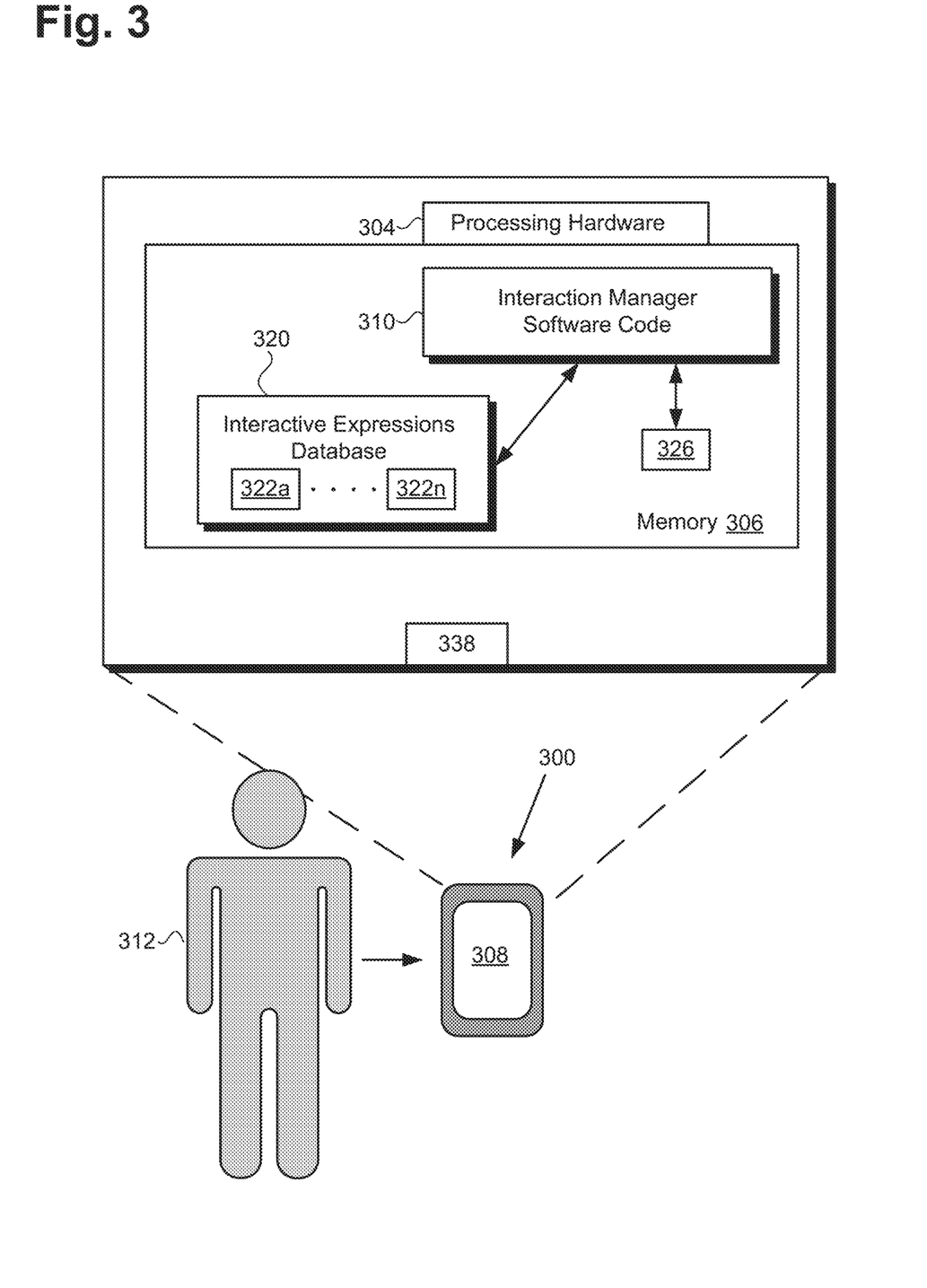
FIG. 3 shows an exemplary system for providing context-based social agent interaction, according to another implementation.

FIG. 3 shows an exemplary system providing context-based social agent interaction, according to another implementation. As shown in FIG. 3, system 300 is shown as a mobile device of system user 312. As further shown in FIG. 3, system 300 includes processing hardware 304, memory 306 implemented as a non-transitory storage medium, display 308, and transceiver 338. According to the exemplary implementation shown in FIG. 3, memory 306 of system 300 stores interaction manager software code 310, interactive expressions database 320 including interactive expressions 322a, . . . , 322n (hereinafter "interactive expressions 322a-322n"), and interaction history 326 of system user 312.

Although depicted as a smartphone or tablet computer in FIG. 3, in various implementations, system 300 may take the form of any suitable mobile computing system that implements data processing capabilities sufficient to provide a user interface, and implement the functionality ascribed to system 300 herein. For example, in other implementations, system 300 may take the form of a smartwatch or other smart wearable device providing display 308.

System 300 and system user 312 correspond respectively in general to system 100 and system user 112, in FIG. 1. Consequently, system 300 and system user 312 may share any of the characteristics attributed to respective system 100 and system user 112 by the present disclosure, and vice versa. Thus, although not shown in FIG. 3, like system 100, system 300 may include features corresponding respectively to input unit 130/230, input device 132, and output unit 140/240. Moreover processing hardware 304, memory 306, display 308, and transceiver 338, in FIG. 3, correspond respectively in general to processing hardware 104, memory 106, display 108, and transceiver 138, in FIG. 1. Thus, processing hardware 304, memory 306, display 308, and transceiver 338 may share any of the characteristics attributed to respective processing hardware 104, memory 106, display 108, and transceiver 138 by the present disclosure, and vice versa.

In addition, interaction manager software code 310 and interactive expressions database 320 including interactive expressions 322a-322n, in FIG. 3, correspond respectively in general to interaction manager software code 110 and interactive expressions database 120 including interactive expressions 122a-122n, in FIG. 1, while interaction history 326 corresponds in general to any one of interaction histories 126a-126k. That is to say, interaction manager software code 310 and interactive expressions database 320 including interactive expressions 322a-322n may share any of the characteristics attributed to respective interaction manager software code 110 and interactive expressions database 120 including interactive expressions 122a-122n by the present disclosure, and vice versa, while interaction history 326 may share any of the characteristics attributed to interaction histories 126a-126k. In other words, system 300 may include substantially all of the features and functionality attributed to system 100 by the present disclosure.

According to the exemplary implementation shown in FIG. 3, interaction manager software code 310 and interactive expressions database 320 are located in memory 306 of system 300, subsequent to transfer of interaction manager software code 310 and interactive expressions database 320 to system 300 over a packet-switched network, such as the Internet, for example. Once present on system 300, interaction manager software code 310 and interactive expressions database 320 may be persistently stored in memory 306, and interaction manager software code 310 may be executed locally on system 300 by processing hardware 304.

One advantage of local retention and execution of interaction manager software code 310 on system 300 in the form of a mobile device of system user 312 is that any personally identifiable information (PII) or other sensitive personal information of system user 312 stored on system 300 may be sequestered on the mobile device in the possession of system user 312 and be unavailable to system 100 or other external agents.

Figure 4:
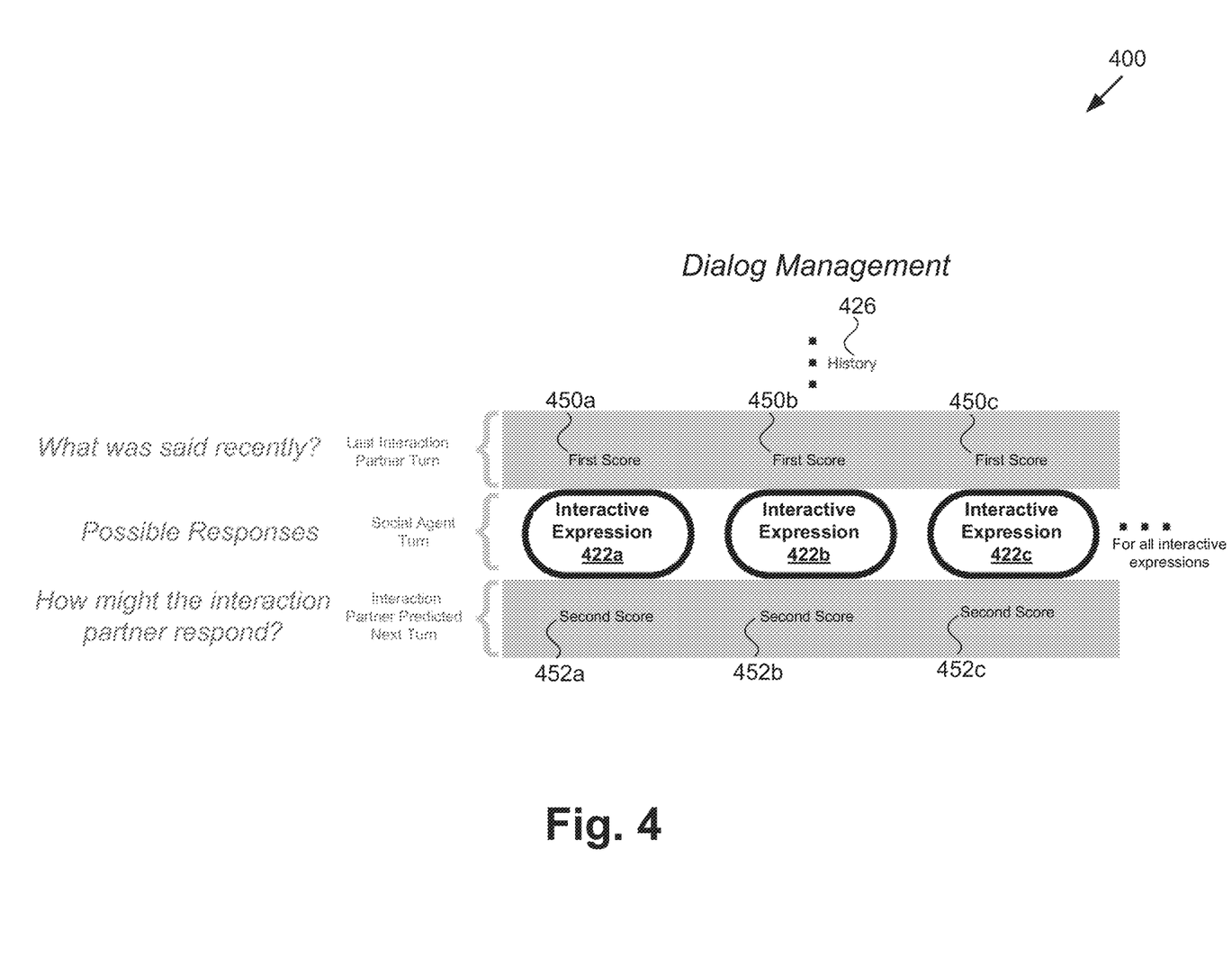
FIG. 4 shows a diagram outlining a decision process suitable for use in providing context-based social agent interaction, according to one implementation.

FIG. 4 shows diagram 400 outlining a decision process suitable for use in providing context-based social agent interaction, according to one implementation. As shown by diagram 400, such a decision process includes consideration of the entire context of an interaction between a social agent and an interaction partner of the social agent, such as system user 112/312, for example. That is to say, the decision process considers any interaction history 426 of the social agent with the interaction partner, determines first scores 450a, 450b, 450c (hereinafter "first scores 450a-450c") for each of respective interactive expressions 422a, 422b, and 422c (hereinafter "interactive expressions 422a-422c"), respectively. In other words first score 450a is determined for interactive expression 422a, first score 450b is determined for interactive expression 422b, first score 450c is determined for interactive expression 422c, and so forth. As discussed in greater detail below, first scores 450a-450c may be determined based on the present state of the interaction between the social agent and the interaction partner, as well as on interaction history 426.

The decision process shown by diagram 400 also predicts a state change of the interaction based on each of interactive expressions 422a-422c, and determines second scores 452a, 452b, and 452c (hereinafter "second scores 452a-452c") for respective interactive expressions 422a-422c using the state change predicted to occur as a result of each interactive expression. The decision process then selects one or more of interactive expressions 422a-422c to interact with the interaction partner using the first scores and the second scores determined for each of interactive expressions 422a-422c. It is noted that although diagram 400 depicts a use case in which one or more of interactive expressions 422a-422c is/are selected to continue an interaction, in other use cases one or more of interactive expressions 422a-422c may be selected to initiate an interaction.

It is further noted that interactive expressions 422a-422c correspond respectively in general to interactive expressions 122a-122n/322a-322n, in FIGS. 1 and 3. Consequently, interactive expressions 422a-422c may share any of the characteristics attributed to corresponding interactive expressions 122a-122n/322a-322n by the present disclosure, and vice versa. Moreover, interaction history 426, in FIG. 4, corresponds in general to any of interaction histories 126a-126k or interaction history 326, in FIGS. 1 and 3. As a result, interaction history 426 may share any of the characteristics attributed to corresponding interaction histories 126-126k or interaction history 326 by the present disclosure, and vice versa.

Figure 5:
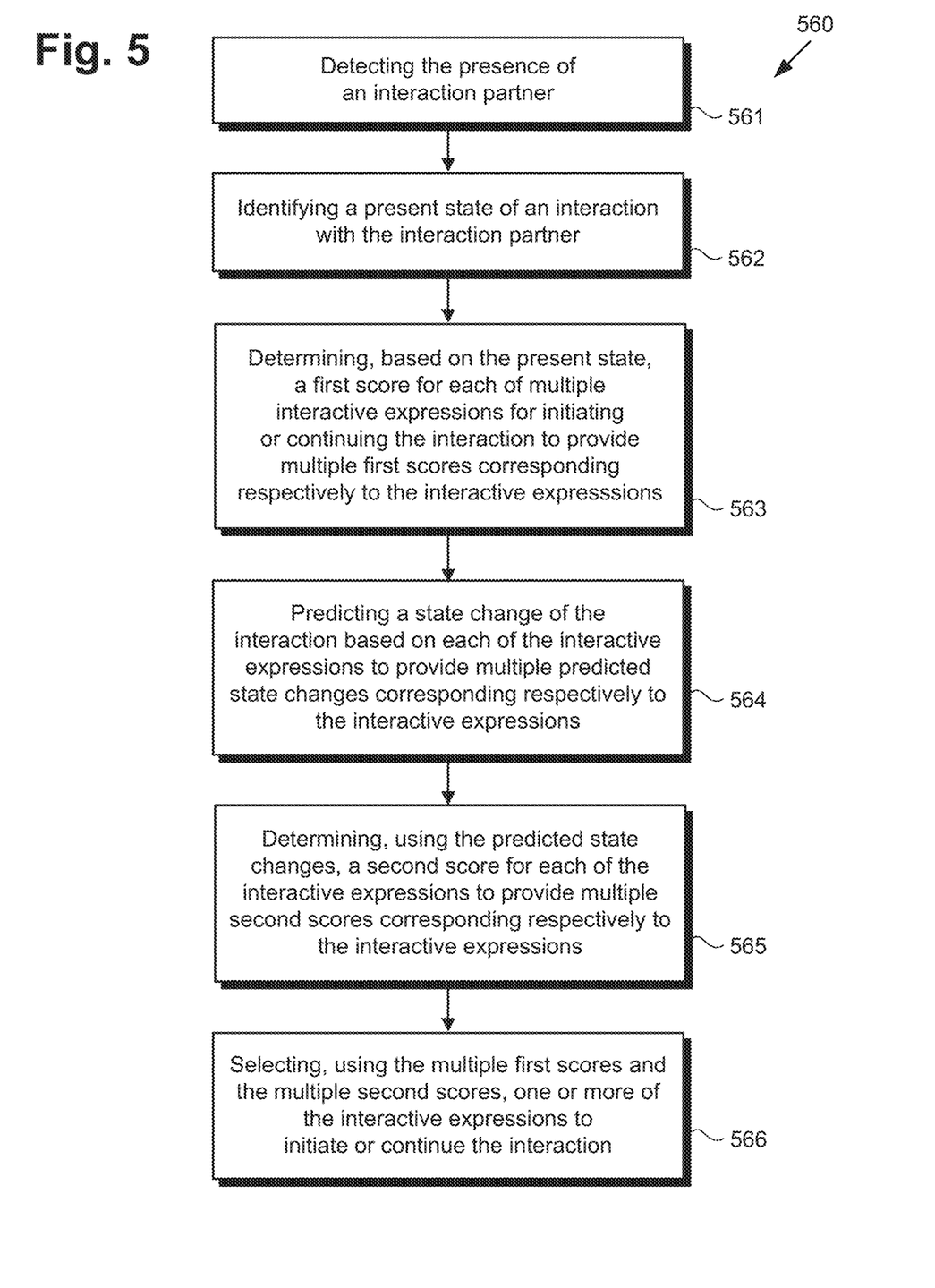
FIG. 5 shows a flowchart presenting an exemplary method for use by a system to provide context-based social agent interaction, according to one implementation.

The functionality of interaction manager software code 110/310 will be further described by reference to FIG. 5. FIG. 5 shows flowchart 560 presenting an exemplary method for use by a system to provide context-based social agent interaction, according to one implementation. With respect to the method outlined in FIG. 5, it is noted that certain details and features have been left out of flowchart 560 in order not to obscure the discussion of the inventive features in the present application.

Referring to FIG. 5, with further reference to FIGS. 1, 2A, and 3, flowchart 560 may begin with detecting the presence of an interaction partner (action 561). As noted above, an interaction partner for social agent 116a, for example, may include system user 112/312 of system 100/300, social agent 116b instantiated by another interactive machine, or both. Detection of the presence of such an interaction partner may be based on data obtained by any one or more of sensors 234 and microphone(s) 235 of input unit 130/230. Moreover, in some implementations, action 561 may result from an input or inputs received via input device 132 of system 100/300.

Action 561 may be performed by interaction manager software code 110/310, executed by processing hardware 104/304 of system 100/300. It is noted that in implementations in which detection of the presence of an interaction partner in action 561 is based on audio data obtained by microphone(s) 235, that audio data may further include microphone metadata describing the angle of arrival of sound at microphone(s) 235, as well as the presence of background noise, such as crowd noise, background conversations, or audio output from a television, radio, or other device in the vicinity of social agent 116a.

In implementations in which detection of the presence of an interaction partner in action 561 is based on radar data, that radar data may distinguish between system user 112/312 and hard objects, such as furniture for example, or another interactive machine instantiating social agent 116b. Moreover, that radar data may enable identification of the number of interaction partners present, their respective locations relative to social agent 116a, and in some implementations, physical manifestations by the interaction partners, such as gestures, posture, and head position. Moreover, in implementations in which detection of the presence of an interaction partner in action 561 is based on video, that video may enable identification of even more subtle physical manifestations such as eye gaze and facial expressions of the interaction partner or partners, in addition to their number, relative locations, gestures, postures, and head positions.

Flowchart 560 further includes identifying the present state of an interaction with the interaction partner (action 562). Action 562 may be performed by interaction manager software code 110/310, executed by processing hardware 104/304 of system 100/300, based on one or more of a variety of factors. For example, in some use cases, the present state of the interaction may be identified based at least in part on the nature of the most recent interaction by the interaction partner, e.g., whether the interaction was in the form of a statement, a question, a physical gesture or posture, or a facial expression. In addition, in some use cases, the state of the interaction may be identified at least in part based on information that has previously been "fronted" by the interaction partner.

By way of example, where social agent 116a has previously asked systems user 112/312 if system user 112/312 has a pet, and system user 112/312 has responded by stating: "yes, I have a dog, his name is Rover," the facts that the pet is male, a dog, and is named Rover have been fronted by system user 112 as additional information above and beyond the simple response "yes." That additional fronted information may be used by interaction manager software code 110/310 to identify that the present state of the interaction with system user 112/312 includes the knowledge by social agent 116a that system user 112/312 has a male dog named Rover, thereby enabling the identification of an appropriate interactive expression such as "what breed of dog is Rover," rather than the conversational faux pas "what type of pet do you have?"

Alternatively, or in addition, information previously fronted by system user 112/312 and stored in interaction history 326/426 of system user 112/312, and may later be harvested for use by interaction manager software code 110/310. Thus, in some use cases the present state of the interaction with the interaction partner may be identified by interaction manager software code 110/310, executed by processing hardware 104/304, through evaluation of one or more previous interactive responses by the interaction partner during a present interaction session. Moreover, in some use cases, the present state of the interaction with the interaction partner may be identified by interaction manager software code 110/310, executed by processing hardware 104/304, through evaluation one or more previous interactive responses by the interaction partner during multiple temporally distinct interaction sessions.

In some implementations, the state of the interaction identified in action 562 may depend in part on a goal of the interaction, which may be a predetermined goal of social agent 116a, for example, or may be a goal identified by social agent 116a based on an express input from system user 112/312, such as a stated desire of system user 112/312, or based on an inferred intent of system user 112/312. In implementations in which the interaction with the interaction partner includes a goal, action 562 may include identifying the goal and further identifying the present state of the interaction with respect to progress toward that goal.

In some use cases, identification of the state of the interaction in action 562 may include identification of a flaw in the interaction, such as a misunderstanding or inappropriate response. In those use cases, at least one goal of the interaction may be to repair the flaw, such as by social agent 116a providing a clarifying statement or question. As a specific example, where the present state of the interaction with system user 112/312 includes the knowledge by social agent 116a that system user 112/312 has a male dog named Rover, but in response to the question "what breed of dog is Rover," system user 112/312 states "she is a Shiba Inu." In that specific use case, interaction manager software code 110/310 may be configured to repair the interaction by curing the uncertainty surrounding the sex of Rover by stating "I thought Rover is a male dog, is she actually female?" Thus, in various implementations, interaction manager software code 110/310 may advantageously be configured to identify and repair flaws in an interaction with an interaction partner in real-time during that interaction.

For example, interaction manager software code 110/310 may be configured to project each interactive expression by system user 112/312 or social agent 116b, or a predetermined subset of the most recent interactive expressions by system user 112/312 or social agent 116b, onto a multi-dimensional embedding space, and to analyze the resulting trajectory to determine whether the interaction is deviating from a logical interaction path in the embedding space, based on conversation logic. It is noted that interaction manager software code 110/310 may also be configured to employ conversation logic to recognize topic changes in an interaction between social agent 116a and one or more of system user 112/312 and social agent 116b. Such a configuration of interaction manager software code 110/310 advantageously prevents interaction manager software code 110/310 from misinterpreting a change in subject matter during a successful interaction as a flaw in the interaction requiring repair.

Alternatively, or in addition, interaction manager software code 110/310 may extract one or more interaction quality metrics from the interaction with the interaction partner, and may employ one or more known statistical techniques to analyze those metrics for indications of a flaw in the interaction. In the exemplary case of speech communication, examples of such metrics may include word overlap, language alignment, and sentence or phrase length, to name a few. It is noted that in some situations a flaw in the interaction may result from failure of one or more features of input unit 130/230 or output unit 140/240. For example, if ASR sensor 234d returns a failure to understand (e.g., due to mumbling, static, or excessive noise) interaction manager software code 110/310 may be configured to repair those types of flaws as well, by instructing social agent 116a or 116b to ask system user 112/312 to repeat himself/herself more clearly.

Referring to FIGS. 4 and 5 in combination, flowchart 560 further includes determining, based on the present state of the interaction identified in action 562, a first score for each of multiple interactive expressions for one of initiating or continuing the interaction to provide multiple first scores 450a-450c corresponding respectively to multiple interactive expressions 422a-422c (action 563). Action 563 may be performed by interaction manager software code 110/310, executed by processing hardware 104/304 of system 100/300.

Referring to FIGS. 1 and 3, in some implementations, a first score may be determined for each of interactive expressions 122a-122n/322a-322n stored in interactive expressions database 120/320, while in other implementations, action 563 may include filtering a subset of interactive expressions 122a-122n/322a-322n before determining the first score for each expression of that subset of interactive expressions. For instance, in the example described above in which social agent 116a has asked system user 112/312 if system user 112/312 has a pet, and system user 112/312 has responded by stating: "yes, I have a dog, his name is Rover," the first scores determined in action 563 may be determined only for those of interactive expressions 122a-122n/322a-322n that are related to the topic of pets, or even more specifically, to dogs.

In some implementations, interactive expressions 122a-122n/322a-322n may be predetermined expressions that are merely selectable "as is" from interactive expressions database 120/320 by interaction manager software code 110/310. For example, where as described above, system user 112/312 has stated "yes, I have a dog, his name is Rover," a response by social agent 116a may include the predetermined question: "what is the breed of your dog?" Alternatively, or in addition, in some implementations interactive expressions 122a-122n/322a-322n may include templates for statements or questions that include placeholders to be filled in based on information gathered during an interaction. For instance, rather than asking "what breed is your dog," an interactive expression template in the form of "what breed of dog is (name of dog)" may be included in interactive expressions database 120/320 may be used by interaction management software code 110/310 and the information previously fronted by system user 112/312 to generate the question "what breed of dog is Rover?"

In some implementations, some or all of interactive expressions 122a-122n/322a-322n may include one or more of preamble expressions (hereinafter "prefix expressions") preceding a base interactive expression and concluding expressions (hereinafter "postfix expressions") following the base interactive expression. For example, a base interactive expression in response to a statement by an interaction partner such as system user 112/312 that the as accomplished a task may be: "Congratulations to you!" That base expression may then be combined with one or more of the prefix expression: "That's great!" and the postfix expression: "You must be pleased," for example. Thus, according to the present novel and inventive context-based interaction solution, the same base interactive expression can advantageously be used in combination with prefix expressions, postfix expressions, or both, to generate a response by social agent 116a that includes multiple lines of dialogue.

The first scores determined in action 563 may be determined based on relevance to the present state of the interaction with the interaction partner, such as whether interactive expression is related to the present topic of the interaction, or whether the most recent interaction by the interaction partner was a question or a statement, for example. Those determinations may be rules based, for instance. By way of example, interaction manager software code 110/310 may impose a rule prohibiting responding to a question with a question. In those implementations, interactive expressions 122a-122n/322a-322n in the form of questions may be ignored when determining first scores 450a-450c for interactive expressions 422a-422c responsive to a question from system user 112/312 or social agent 116b, or interactive expressions 422a-422c may be assigned low first scores 450a-450c based on the present state of the interaction.

In implementations in which the interaction with the interaction partner includes a goal, as described above, first scores 450a-450c determined in action 563 may further depend on the extent to which respective interactive expressions 422a-422c make progress towards the goal. That is to say, in some implementations, first scores 450a-450c determined in action 563 may be determined based at least in part on a goal of the interaction, as well as based on its present state.

Flowchart 560 further includes predicting a state change of the interaction based on each of interactive expressions 422a-422c to provide multiple predicted state changes corresponding respectively to interactive expressions 422a-422c (action 564). Action 564 may be performed by interaction manager software code 110/310, executed by processing hardware 104/304 of system 100/300. In some implementations, predicting the state change of the interaction may be rules based, for example, such as the presumption that an interactive expression in the form of a question by social agent 116a is more likely to elicit an answer from system user 112/312 or social agent 116b than a question in return. In some implementations, however, it may be advantageous or desirable for interaction manager software code 110/310 to include one or more machine learning models, as described above, for use in performing action 564.

Flowchart 560 further includes determining, using the predicted state changes predicted in action 564, a second score for each of the interactive expressions 422a-422c to provide multiple second scores 452a-452c corresponding respectively to interactive expressions 422a-422c (action 565). Action 565 may be performed by interaction manager software code 110/310, executed by processing hardware 104/304 of system 100/300.

Second scores 452a-452c determined in action 565 may be determined based on the desirability of the predicted state change resulting from use of each of interactive expressions 422a-422c by social agent 116a. In implementations in which the interaction by social agent 116a with one or both of system user 112/312 and social agent 116b includes a goal, as described above, second scores 452a-452c determined in action 565 may depend on the extent to which the predicted state change resulting from a particular interactive expression makes progress towards the goal. That is to say, in some implementations, the first scores determined in action 563 and the second scores determined in action 565 may be determined based at least in part on a goal of the interaction.

Action 565 may include filtering a subset of interactive expressions 422a-422c before determining the second score for each expression of that subset of interactive expressions. Moreover, filtering of interactive expressions 422a-422c may occur multiple times over the course of the actions outlined by flowchart 560. Thus, as described above, filtering of the interactive expressions may occur prior to determining the first score in action 563. In addition, filtering of the interactive expressions may occur between actions 563 and 565, as well as after determination of the second score in action 565. The filtering criterion or criteria applied at each stage are configurable and are used to ensure continuity of the conversation, reduce needless processing of out-of-context interactive expressions, and prevent repetition of interactive expressions within a predetermined number of turns. In addition, the filtering criteria may be selected to ensure that a sufficient amount of state change is expected to result from use of a particular interactive expression. For example, if system user 112/312 states "the sky is blue," the interactive expression in response "yes, the sky is blue" by social agent 116a or 116b may score very highly due to its relevance to the statement by system user 112/312. Nevertheless, and despite its high relevance score, that response may be filtered out because it is unlikely to change the state of the interaction in a meaningful way.

Figure 6:
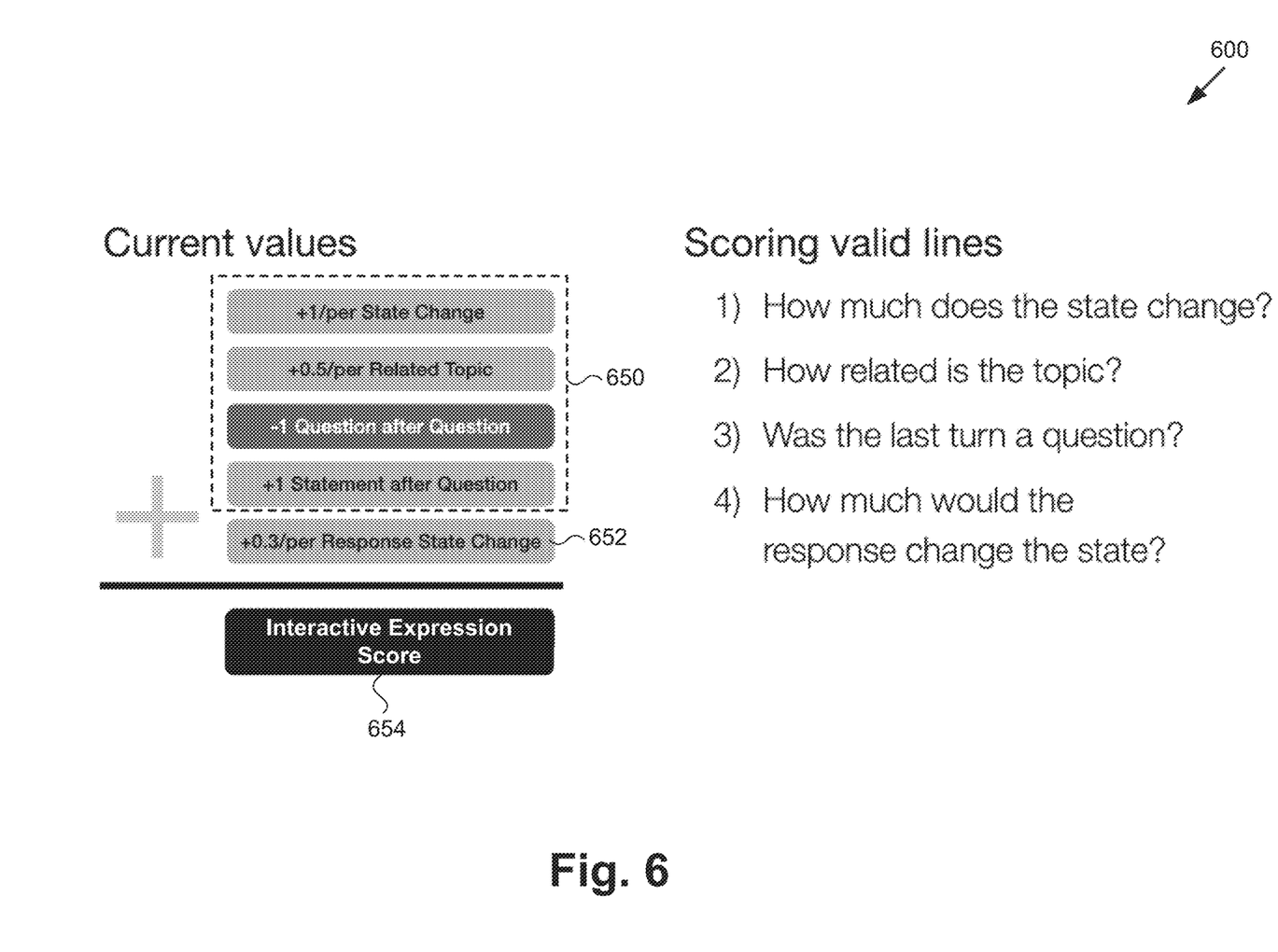
FIG. 6 shows a diagram outlining a scoring strategy for use in providing context-based social agent interaction, according to one implementation.

Flowchart 560 may continue and conclude with selecting, using multiple first scores 450a-450c and multiple second scores 452a-452c, at least one of interactive expressions 422a-422c to initiate or continue the interaction (action 566). Referring to FIG. 6, FIG. 6 shows diagram 600 outlining a scoring strategy for use in providing context-based social agent interaction, according to one implementation. As shown in FIG. 6, the total interactive expression score 654 for a particular interactive expression may be determined from the sum of the first score 650 for that interactive expression with the second score 652 for the same interactive expression. First score 650 and second score 652 correspond respectively in general to any of first scores 450a-450c and second scores 452a-452c, in FIG. 4. Thus, first score 650 and second score 652 may share any of the characteristics attributed, respectively, to first scores 450a-450c and second scores 452a-452c by the present disclosure, and vice versa.

As shown in FIG. 6, in one implementation, first score 650 increases when the interactive expression changes the state of the interaction, when the interactive expression is related to the topic of the interaction, and when the interactive expression is a statement in response to a question. By contrast, first score 650 is reduced when the interactive expression being scored is a question in response to a question from an interaction partner. As further shown in FIG. 6, second score 652 increases when a response to the interactive expression by the interaction partner is predicted to change the state of the interaction.

In some implementations, action 566 may be performed by interaction manager software code 110/310, executed by processing hardware 104/304 of system 100/300, by selecting the interactive expression having the highest interactive expression score 654, for example.

It is noted that, in some implementations, system 100/300 may be configured to dynamically change the scoring criteria applied to the interactive expressions for use by social agent 116a or 116b based on context. For example, the inferred sentiment or intent of system user 112/312 may heavily weight scoring during some stages of an interaction but may have its weighting reduced, or may even be disregarded entirely, during other stages. The advantage conferred by such dynamic scoring flexibility is that it enables system 100/300 to compensate for predictable idiosyncrasies during an interaction with system user 112/312. For example, if there is a stage in an interaction where it is predictable that system user 112/312 will use sarcasm that is not detected well by text-based sentiment analysis, the scoring weight for system user sentiment may be temporarily reduced. Thus, in some implementations, the scoring algorithm applied to interactive expressions by interaction manager software code 110/310 may be modified dynamically during an interaction based on context and conversation logic.

It is further noted that another significant advantage of the present context-based interaction solution is the ability of interaction manager software code 110/310 to process multiple interaction inputs substantially concurrently, as well as to select multiple interactive expressions for use by social agent 116a when interacting with one or both of system user 112/312 and social agent 116b. For example, system user 112/312 may make a statement and ask a question of social agent 116a, or may ask multiple questions at the same time. Interaction manager software code 110/310 may be configured to apply the scoring strategy shown in FIG. 6, for example, to each statement or question by system user 112/312 independently and in parallel to provide multiple responsive statements or answers addressing different topics during the same interaction. Thus, in some use cases, more than one of interactive expressions 122a-122n/322a-322n may be selected interactive expressions 114a and 114b to initiate or continue the interaction of social agent 116a with one or both of system user 112/312 and social agent 116b. That is to say, interaction manager software code 110/310 may be configured to engage in multi-intent interactions, i.e., multiple interactions having different goals and topics, with one or more interaction partners, concurrently. Furthermore, with respect to the method outlined by flowchart 560, it is emphasized that, in some implementations, actions 561 through 566 may be performed in an automated process from which human involvement may be omitted.

Thus, the present application discloses systems and methods for providing context-based social agent interaction that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for performing context-based social agent interactions with human beings, the system comprising:
  a processing hardware;
  a memory storing a software code;
  a social agent instantiated as a robot, a virtual character, or a tabletop or wall-mounted device, the social agent comprising an output unit configured to effectuate an interactive expression of the social agent, the output unit comprising a display, a speaker, a mechanical actuator, or a haptic actuator;
  at least one detector comprising at least one sensor or at least one microphone;
  the processing hardware configured to execute the software code to:
    detect, using the at least one detector, presence of a human being;
    identify a present state of an interaction with the human being based on a first expression of the human being;
    determine, based on scoring criteria and the present state, a first score for each of a plurality of interactive expressions for one of initiating or continuing the interaction to provide a plurality of first scores corresponding respectively to the plurality of interactive expressions, each of the plurality of interactive expressions being potential responses to be provided by the social agent in response to the first expression of the human being;
    predict a state change of the interaction based on use of each of the plurality of interactive expressions in response to the first expression of the human being to determine a plurality of predicted state changes corresponding respectively to the plurality of interactive expressions;

determine, using the plurality of predicted state changes, a second score for each of the plurality of interactive expressions to determine a plurality of second scores corresponding respectively to the plurality of interactive expressions, wherein the second score is determined based on a desirability of a predicted state change resulting from use of each of the plurality of interactive expressions in response to the first expression of the human being; and select, using the plurality of first scores and the plurality of second scores, at least one of the plurality of interactive expressions to initiate or continue the interaction; and initiate or continue the interaction with the human being by providing, using the output unit of the social agent, the selected at least one of the plurality of interactive expressions to the human being.

2. The system of claim 1, wherein the processing hardware is further configured to execute the software code to:
identify a filtering criterion for the plurality of interactive expressions; and
filter out one or more of the plurality of interactive expressions based at least in part on the filtering criterion.

3. The system of claim 1, wherein the processing hardware is further configured to execute the software code to identify the present state of the interaction by evaluating a plurality of previous interactive responses by the human being during a present interaction session.

4. The system of claim 1, wherein the processing hardware is further configured to execute the software code to identify the present state of the interaction by evaluating a plurality of previous interactive responses by the human being during multiple interaction sessions.

5. The system of claim 1, wherein the processing hardware is further configured to execute the software code to:
identify a goal of the interaction;
wherein the plurality of first scores and the plurality of second scores are determined based at least in part on the goal.

6. The system of claim 5, wherein the goal comprises repairing a flaw in the interaction.

7. The system of claim 1, wherein more than one of the plurality of interactive expressions are selected to initiate or continue the interaction.

8. A method of performing context-based social agent interactions with human beings by a system having a processing hardware, and a memory storing a software code, a social agent instantiated as a robot, a virtual character, or a tabletop or wall-mounted device, the social agent comprising an output unit configured to effectuate an interactive expression of the social agent, the output unit comprising a display, a speaker, a mechanical actuator, or a haptic actuator, and at least one detector comprising at least one sensor or at least one microphone, the method comprising:
detecting, by the software code executed by the processing hardware and using the at least one detector, presence of a human being;
identifying, by the software code executed by the processing hardware, a present state of an interaction with the human being based on a first expression of the human being;
determining, by the software code executed by the processing hardware, based on scoring criteria and the present state, a first score for each of a plurality of interactive expressions for one of initiating or continuing the interaction to provide a plurality of first scores corresponding respectively to the plurality of interactive expressions, each of the plurality of interactive expressions being potential responses to be provided by the social agent in response to the first expression of the human being;

predicting, by the software code executed by the processing hardware, a state change of the interaction based on use of each of the plurality of interactive expressions in response to the first expression of the human being to determine a plurality of predicted state changes corresponding respectively to the plurality of interactive expressions;

determining, by the software code executed by the processing hardware and using the plurality of predicted state changes, a second score for each of the plurality of interactive expressions to determine a plurality of second scores corresponding respectively to the plurality of interactive expressions, wherein the second score is determined based on a desirability of a predicted state change resulting from use of each of the plurality of interactive expression s in response to the first expression of the human being;

selecting, by the software code executed by the processing hardware and using the plurality of first scores and the plurality of second scores, at least one of the plurality of interactive expressions to initiate or continue the interaction; and initiating or continuing the interaction with the human being, by the software code executed by the processing hardware, by providing, using the output unit of the social agent, the selected at least one of the plurality of interactive expressions to the human being.

9. The method of claim 8, further comprising:
identifying, by the software code executed by the processing hardware, a filtering criterion for the plurality of interactive expressions; and
filtering out, by the software code executed by the processing hardware, one or more of the plurality of interactive expressions based at least in part on the filtering criterion.

10. The method of claim 8, wherein identifying the present state of the interaction comprises evaluating a plurality of previous interactive responses by the human being during a present interaction session.

11. The method of claim 8, wherein identifying the present state of the interaction comprises evaluating a plurality of previous interactive responses by the human being during multiple interaction sessions.

12. The method of claim 8, further comprising:
identifying, by the software code executed by the processing hardware, a goal of the interaction;
wherein the plurality of first scores and the plurality of second scores are determined based at least in part on the goal.

13. The method of claim 12, wherein the goal comprises repairing a flaw in the interaction.

14. The method of claim 8, wherein more than one of the plurality of interactive expressions are selected to initiate or continue the interaction.

15. The system of claim 1, wherein:
the social agent is instantiated as the robot;
the output unit comprises the mechanical actuator or the haptic actuator;

the selected at least one of the plurality of interactive expressions comprises a facial expression or a movement by the robot; and the facial expression or the movement by the robot is executed using the mechanical actuator or the haptic actuator.

16. The system of claim 1, wherein:

the output unit comprises the display and a Speech-To-Text (STT) module, or the output unit comprises the speaker and a Text-To-Speech (TTS) module.

17. The system of claim 1, wherein:

the processing hardware is further configured to execute the software code to identify the present state of the interaction by evaluating a plurality of previous interactive responses by the human being stored in an interaction history database, and data describing the plurality of previous interactive responses stored in the interaction history database is exclusive of personally identifiable information of the human being.

18. The system of claim 1, wherein:

the detector comprises the at least one sensor, and the at least one sensor comprises a radio detection and ranging (radar) detector; a laser imaging, detection, and ranging (lidar) detector; a camera; an automatic speech recognition (ASR) sensor; a radio-frequency identification (RFID) sensor; a facial recognition (FR) sensor; or an object recognition (OR) sensor.

19. The system of claim 1, wherein the selected at least one of the plurality of interactive expressions comprises a base interactive expression and at least one of a prefix expression preceding the base interactive expression or a postfix expression following the base interactive expression to generate multiple lines of dialogue.

20. The system of claim 1, wherein the processing hardware is further configured to execute the software code to dynamically change the scoring criteria based on context and conversation logic during determining the first score for each of a plurality of interactive expressions.

* * * * *